(12) United States Patent
Yanagi

(10) Patent No.: US 7,055,365 B2
(45) Date of Patent: Jun. 6, 2006

(54) LOAD SENSOR AND SEAT WEIGHT MEASURING APPARATUS WITH A PLURALITY OF STRAIN GAUGES

(75) Inventor: Eiji Yanagi, Yokohama (JP)

(73) Assignee: Takata Corporation, Tokyo (JP)

( * ) Notice: Subject to any disclaimer, the term of this patent is extended or adjusted under 35 U.S.C. 154(b) by 237 days.

(21) Appl. No.: 10/720,250

(22) Filed: Nov. 25, 2003

(65) Prior Publication Data

US 2004/0124018 A1    Jul. 1, 2004

(30) Foreign Application Priority Data

Dec. 26, 2002  (JP) .............................. 2002-376643

(51) Int. Cl.
  *G01G 23/01*  (2006.01)
  *B06R 21/16*  (2006.01)
  *G01L 1/18*  (2006.01)
  *G03G 3/01*  (2006.01)

(52) U.S. Cl. .................... 73/1.13; 73/1.15; 73/862.627; 73/862.628; 73/862.634; 180/273; 177/211; 177/229; 280/735

(58) Field of Classification Search ................ 180/273; 280/735; 177/136, 144, 211, 229; 73/862.627–862.642, 73/1.13, 1.15
See application file for complete search history.

(56) References Cited

U.S. PATENT DOCUMENTS

| | | | | |
|---|---|---|---|---|
| 4,217,785 A | * | 8/1980 | Spoor | 73/766 |
| 4,261,429 A | * | 4/1981 | Lockery | 177/211 |
| 4,267,724 A | * | 5/1981 | Spoor | 73/862.628 |
| 4,331,035 A | * | 5/1982 | Eisele et al. | 73/765 |
| 4,432,247 A | | 2/1984 | Takeno et al. | 73/862.623 |
| 4,556,115 A | * | 12/1985 | Lockery et al. | 177/211 |
| 4,848,493 A | * | 7/1989 | Hitchcock | 177/211 |
| 4,898,255 A | * | 2/1990 | Gaines | 177/211 |
| 4,903,000 A | | 2/1990 | Yajima et al. | 338/4 |
| 4,979,580 A | * | 12/1990 | Lockery | 177/211 |
| 4,993,506 A | * | 2/1991 | Angel | 177/211 |
| 5,222,398 A | * | 6/1993 | O'Brien | 73/862.632 |
| 5,289,722 A | * | 3/1994 | Walker et al. | 73/775 |
| 5,375,474 A | * | 12/1994 | Moore, Sr. | 73/766 |
| 5,404,124 A | * | 4/1995 | Ruppin et al. | 338/2 |
| 5,510,581 A | * | 4/1996 | Angel | 177/211 |
| 5,512,713 A | * | 4/1996 | Naito et al. | 177/211 |
| 5,573,269 A | | 11/1996 | Gentry et al. | 280/735 |
| 5,929,390 A | * | 7/1999 | Naito et al. | 177/211 |
| 6,039,344 A | | 3/2000 | Mehney et al. | 280/735 |
| 6,069,325 A | | 5/2000 | Aoki | 177/136 |

(Continued)

FOREIGN PATENT DOCUMENTS

CH        673 893 A5    4/1990

(Continued)

*Primary Examiner*—Randy W. Gibson
(74) *Attorney, Agent, or Firm*—Foley & Lardner LLP

(57) ABSTRACT

A load sensor hardly causing error in weight measurement even when the environmental temperature of the load sensor varies, and a seat weight measuring apparatus using the load sensor. The sensor includes a plurality of strain gauges form a bridge circuit. The strain gauges forming the bridge circuit are attached to the front and back surfaces of a base plate at substantially the same location. Portions of a flexible substrate, on which the strain gauges are formed, are folded and adhered to the back of the sensor plate with adhesive. The bridge circuit formed by the strain gauges compensates for the variation in resistance among the strain gauges generated due to the temperature distribution of the base plate, resulting in little or no variation in output.

11 Claims, 7 Drawing Sheets

U.S. PATENT DOCUMENTS

| | | |
|---|---|---|
| 6,098,464 A | 8/2000 | Avisse et al. .................. 73/708 |
| 6,231,076 B1 * | 5/2001 | Blakesley et al. ........... 280/735 |
| 6,407,350 B1 * | 6/2002 | Blakesley .................... 177/211 |
| 6,431,013 B1 * | 8/2002 | Nonnenmacher et al. ..................... 73/862.632 |
| 6,467,361 B1 * | 10/2002 | Rainey et al. .......... 73/862.637 |
| 6,555,767 B1 * | 4/2003 | Lockery et al. .............. 177/211 |
| 6,910,392 B1 * | 6/2005 | Lockery et al. ........ 73/862.627 |
| 2002/0033283 A1 | 3/2002 | Miura et al. ................ 177/229 |
| 2002/0190949 A1 * | 12/2002 | Hirano et al. |

FOREIGN PATENT DOCUMENTS

| | | |
|---|---|---|
| DE | 21 18 305 A | 11/1971 |
| EP | 0 962 362 A2 | 12/1999 |
| EP | 0 990 565 A1 | 4/2000 |
| JP | 2000-180255 A | 6/2000 |
| JP | 2000-258233 A | 9/2000 |

* cited by examiner

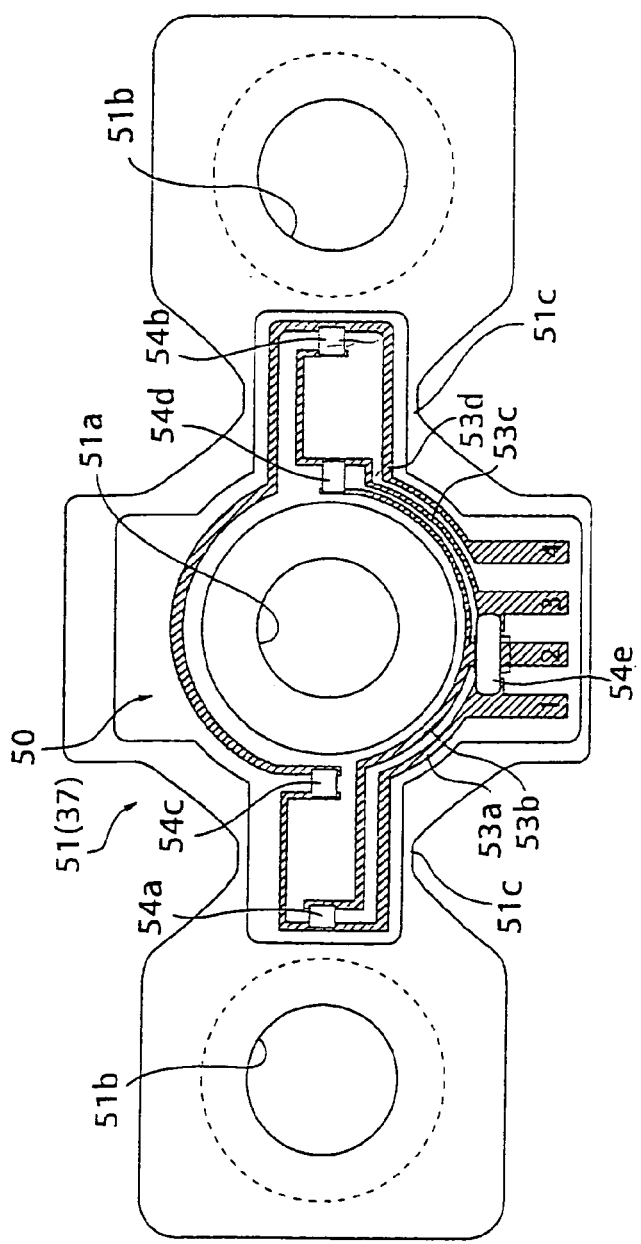
Fig. 11(A) Prior Art
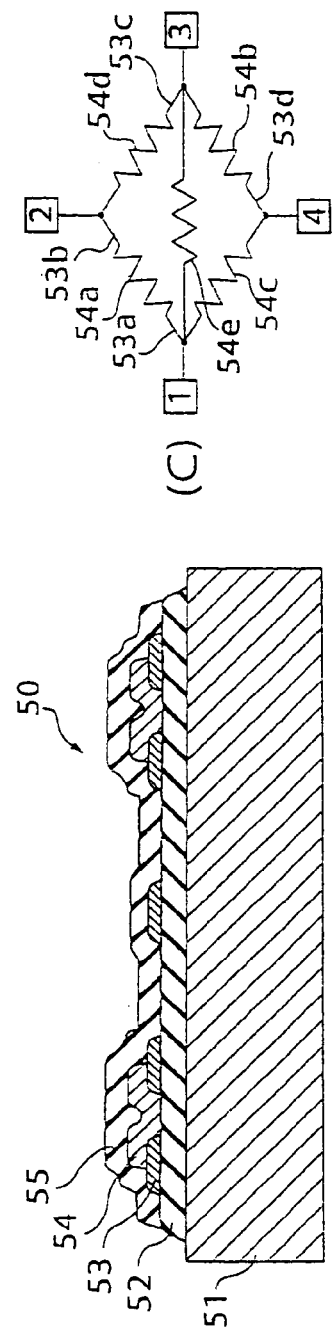
Fig. 11(B) Prior Art
Fig. 11(C) Prior Art

LOAD SENSOR AND SEAT WEIGHT MEASURING APPARATUS WITH A PLURALITY OF STRAIN GAUGES

BACKGROUND OF THE INVENTION

The present invention relates to a load sensor for measuring a load and converting the load into an electrical signal and a seat weight measuring apparatus employing the same.

Automobiles are equipped with seat belt devices and airbag devices as facilities for ensuring the safety of occupants. In order to improve the performance of the seat belt device and the airbag device, there are recent trends to control the actions of these safety devices depending on the weight (body weight) of an occupant. For example, the amount of gas for deploying the airbag and the energy absorbing (EA) load of the seat belt are adjusted depending on the weight of the occupant. For this purpose, some means are needed for measuring the weight of the occupant sitting on the seat. An example of such means is a proposal which involves arranging load sensors (load cell) at four corners of seat rails, obtaining vertical loads acting on the load cells, and summing them to determine the seat weight including the weight of the occupant.

A Load sensor, as mentioned above, is preferably a small-sized one capable of measuring about 50 kg at the maximum. Examples of such load sensors include a sensor comprising a sensor plate which is deflected depending on the received load and a strain gauge attached to (formed on) the sensor plate, and a sensor comprising a elastic member which is deflected depending on the received load and an electrical capacitance sensor detecting the displacement of the elastic member. A thick-film strain gauge may be used as the strain gauge.

As an example of the seat weight measuring apparatus and the load sensor as mentioned above, the devices disclosed in Japanese Patent Unexamined Publication No 2000-180255 (incorporated by reference) will be described. FIG. 9 is a side view schematically showing the entire structure of a seat weight measuring apparatus of the prior art. In this specification, the words "front and rear", "left and right" without any definition mean the front and rear, the left and right for an occupant 1.

In this drawing, a seat 3, an occupant 1 on the seat, and seat weight measuring apparatuses 5 beneath the seat are shown. The seat 3 comprises a seat cushion 3a on which the occupant 1 sits, and a seat back 3b as a backrest. Seat adjustors 10 are disposed at four locations, front and rear on both sides of the bottom of the seat cushion 3a to project from the seat cushion 3a. It should be noted that only two of the adjustors 10 are shown which are located front and rear on the left side. The adjustors 10 on the right side are behind the adjustors 10 on the left side. The same is true for the following components of this apparatus in relation on the drawing. The seat adjustor 10 is an extending portion of a frame inside the seat 3 and is slidable in the front-and-rear direction on a seat rail 11 by adjustment operation of the occupant 1.

The seat rail 11 has a groove (not shown) and is a member extending in the longitudinal direction (front-and-rear direction) of a vehicle. The lower end portion of the seat adjustor 10 can slide within and along the groove. Two seat rails 11 are provided on the left and right sides beneath the seat cushion 3a, respectively. In a conventional seat without a seat weight measuring apparatus, the seat rails 11 are securely fixed to a seat bracket of a vehicle chassis by bolts. One of the seat rails 11 is provided, at one location near the rear end thereof, with an anchor fixing portion 12 for fixing a buckle 4 of a seat belt device 2. Tension of the seat belt 2 is exerted on the anchor fixing portion 12.

A pair of seat weight measuring apparatuses 5, i.e. the front and rear seat measuring apparatuses 5, are provided below the seat rail 11. The front and rear seat weight measuring apparatuses 5 are also provided below the right-side seat rail which is not shown. Consequently, the seat weight measuring apparatuses 5 are disposed at four locations, front and rear on both sides below the seat 3. Each seat weight measuring apparatus 5 comprises a seat supporting mechanism 17 and a displacement restriction mechanism 25 and disposed between the seat rail 11 and a seat fixing portion 19. In this example, the seat supporting mechanism 17 comprises a load sensor 13 and a deflection member 15 which are connected in series. The load sensor 13 detects the load applied to the seat supporting mechanism 17. The deflection member 15 is a member for enhancing the displacement (movement) of the seat rail 11 when the weight of the occupant is applied to the seat 3.

In this example, the displacement restriction mechanism 25 comprises a restriction bar 21 connected to the bottom of the seat rail 11, and a restriction block 23 formed on the seat fixing portion 19. The restriction bar 21 has an end portion 21a of which diameter is enlarged just like a flange. The restriction block 23 has a recess 23a inside thereof. On the top end of the recess 23a, a flange 23b extending inwardly is formed. The restriction bar end portion 21a is fitted in the recess 23a of the restriction block with some spaces above and below, in front and rear, and on left and right thereof.

When an abnormal load is applied to the seat rail 11 so that the load sensor 13 and the deflection member 15 are deformed beyond a certain level, the restriction bar end portion 21a of the displacement restriction mechanism 25 collides with the inner wall of the recess 23a of the restriction block. For example, when the occupant 1 tending to move forward is restrained by the seat belt 2, tension is applied to the seat belt 2 due to the inertia of the occupant 1. At this point, the restriction bar 21 is pulled up to move upward. However, the movement of the restriction bar 21 is prevented by the lower surface of the flange 23b of the restriction block.

As mentioned above, the displacement restriction mechanism 25 for restricting the relative displacement between the seat and the seat fixing portion into a certain range is provided. In this case, when a force over a predetermined range (for example, a force exceeding the measurable range) is applied to the load sensor 13, the excess load is received by the displacement restriction mechanism (load limiting mechanism) 25, not the load sensor 13. Therefore, the required mechanical strength of the load sensor 13 can be significantly reduced, thereby achieving the miniaturization and reduction in cost of the load sensor 13.

Now, the relation between the displacement restriction mechanism 25 and the deflection member 15 of the seat supporting mechanism 17 will be described. If the deflection member 15 is not employed (a rigid member is employed) and the deformation of load sensor 13 over the measurable range is in the order of 0.1 mm, the space between the restriction bar end portion 21a of the displacement restriction mechanism 25 and the recess 23a of the restriction block should also be in the order of 0.1 mm, because the restriction bar end portion 21a is required to abut against the internal surface of the recess 23a of the restriction block as soon as the load exceeds the measurable range, so that the excess load is withstood by the displacement restriction mechanism 25.

That is, the displacement restriction mechanism 25 is required to have an operational precision in the order of 0.1 mm corresponding to the 0.1 mm stroke of the load sensor 13, which in turn requiring the parts dimensional precision and assembly precision in the order of 0.01 mm. This can not be fulfilled at all with current dimensional precision of the peripheral parts of the vehicle seat, which mainly consist of pressed products. In short, the small deflection stroke of the load sensor 13 calls for a high dimensional precision in the displacement restriction mechanism (load limiting mechanism) 25 and the peripheral members thereof. In this example, the deflection stroke of the seat supporting mechanism 17 in the measurable range or load bearing range of the load sensor 13 is amplified by the action of the deflection member 15 of the seat supporting mechanism 17. As a result, the dimensional precision and assembly precision requirements for members constituting the seat supporting mechanism 17 and the displacement restriction mechanism 25 can be alleviated.

Hereinafter, specific examples of the seat supporting mechanism and the displacement restriction mechanism will be described. FIGS. 10(A), 10(B) show the structure of a seat weight measuring apparatus of prior art, in which FIG. 10(A) is a general sectional side view and FIG. 10(B) is a plan view of a sensor plate. Shown in the uppermost portion of FIG. 10(A) is a seat rail 11. Under the seat rail 11, a sensor frame upper plate 31 and a sensor frame 33 are fixed by means of bolts 32. The sensor frame upper plate 31 is a durable plate having a hole 31a at the center. The sensor frame 33 has a saucer-like configuration with a recessed central portion. Formed around the upper external periphery of the frame 33 is a flange 33a which is fixed to the sensor frame upper plate 31 by means of the bolts 32, as described above. The bottom plate 33b of the sensor frame 33 is provided with a hole 33c formed at the center thereof.

A sensor plate 37 is fixed by means of bolts 35 to the lower surface of the sensor frame upper plate 31. The sensor plate 37 is made of a stainless steel and is a rectangular plate with a thickness of 3 mm, a width of 20 mm, and a length of 80 mm. As shown in FIG. 10(B), the sensor plate 37 is provided with a central through hole 37c formed in the central portion and with bolt holes 37a formed in the both side portions. Attached to the upper surface of the sensor plate 37 are resistor-type strain gauges 37b, a pair of them being attached on each front and rear portions of the plate (left and right portions in FIG. 10(B)). These resistor-type strain gauges 37b are for measuring the load acting on the sensor plate 37, by detecting the distortion of the plate 37.

Fitted into the hole 37c located at the center of the sensor plate 37 is a central shaft 39, and the sensor plate 37 and the central shaft 39 are fixed to each other by means of a nut 39a. Into the holes 37a located at both sides of sensor plate 37, bolts 35 are inserted upwardly, thereby fixing the sensor plate 37 to the sensor frame upper plate 31.

The central shaft 39 is a cylindrical shaft having several steps and flanges. The central shaft 39 comprises, from its upper side, an upper nut 39a, a flange 39b, a sensor frame penetrating portion 39c, a small diameter portion 39d, a lower nut 39e, and the like. The upper nut 39a fixes the sensor plate 37 as described above. The nut 39a enters into the central hole 31a of the sensor frame upper plate 31. In the nominal state, the gaps between the nut 39a and the hole 31a are, for example, 0.25 mm in the vertical direction and 0.5 mm in the radial direction. When the seat rail 11 is subjected to a large force and the deformation of parts including the sensor plate 37 is increased, the nut 39a comes in contact with the internal surface of the hole 31a. At this point, the further deformation of the sensor plate 37 is stopped. That is, the nut 39a on the central shaft and the central hole 31a of the sensor frame upper plate compose the displacement restriction mechanism.

The outer diameter of the flange 39b of the central shaft 39 is greater than the diameter of the central hole 33c of the sensor frame 33, the lower surface of the flange 39b facing the upper surface of the sensor frame bottom plate 33b with a gap of 0.25 mm in the nominal state. When the seat rail 11 is subjected to a force acting upward and the deformation of the sensor plate 37 advances, the sensor frame 33 is lifted and the central upper surface 33d of the frame bottom plate 33b comes in contact with the bottom surface of the central shaft flange 39b. Meanwhile, a gap of 0.7 mm exists between the outer periphery of the sensor frame penetrating portion 39c of the central shaft 39 and the inner periphery of the sensor frame central hole 33c in the nominal state. This portion also composes the displacement restriction mechanism.

The small diameter portion 39d of the central shaft 39 extends downward from the sensor frame penetrating portion 39c with decreasing its diameter stepwise. The nut 39e is screwed to the end of the small diameter portion 39d. Fitted onto the outer periphery of the small diameter portion 39d are, from its upper side, a washer 41, a rubber washer 43, a sensor base 45, another rubber washer 43, and another washer 41. The washers 41 are made of metal. The rubber washers 43 expand and contract by about 0.5 mm in the sum of two sheets, upper and lower, for a load variation of about 50 kgf in the vertical direction. The rubber washers 43 serve to absorb dimensional difference and distortion between the seat rail 11 and the seat fixing portion (a seat bracket 47).

The sensor base 45 is a metal plate and comprises a lowermost member of the seat weight measuring apparatus. The upper and lower washers 41, the upper and lower rubber washers 43, and the sensor base 45 are retained between the lower step of the sensor frame penetrating portion 39c of the central shaft 39 and the lower nut 39e. The end 45b of the sensor base 45 is fixed to the seat bracket 47 by means of a bolt which is not shown. The seat bracket 47 projects from the vehicle chassis.

The general action of the seat weight measuring apparatus of FIGS. 10(A), 10(B) will be summarized. The weight of a seat and a occupant loaded on the seat rail 11 are normally transmitted via the sensor plate 37 to the central shaft 39, the rubber washers 43, the sensor base 45, and the seat bracket 47. At this time, the sensor plate 37 gives rise to a deflection roughly proportional to the load which is detected by the strain gauges 37b, to measure the load acting on the sensor plate 37 in the vertical direction. The weight of the occupant is obtained by summing the loads measured by the respective load sensors, front and rear on both sides, and subtracting the known weights of the seat and the seat rail from the sum.

On the other hand, when an abnormal force exceeding the measurable range or load limit of the load sensor is applied to the seat rail 11, the central shaft nut 39a comes in contact with the internal surface of the central hole 31a of the sensor frame upper plate, or otherwise, the central shaft flange 39b or the sensor frame penetrating portion 39c comes in contact with the sensor frame bottom plate 33b. This action of the displacement restriction mechanism prevents excessive deformation of the sensor plate 37 while securely connecting the seat rail 11 and the seat bracket 47.

For eliminating the influence of noise under the on-vehicle circumstances, generally the electrical output should be increased, so it is required to apply deformation distortion as large as possible to the sensor plate. For this, portions under the resistors for detecting deformation of the sensor plate are required to be deformed to obtain the maximum distortion within a range allowed by the base and the laminated layers (sensor). When the distortion is locally concentrated, however, the sensitivity is unsteady according to the distortion pattern of the sensor plate and further localized concentration occurs due to impact or the like, the strain on a portion may exceed the allowable limit and the portion may be broken. Therefore, in order to effectively utilize the allowable range for the sensor plate and the laminated layers, the sensor plate should be made in such a manner as to disperse the deformation stress and to unify the distortion on the surface to obtain distortion corresponding to 70% or more of the maximum distortion about the resistors on the sensor plate.

Hereinafter, the structure of the sensor plate and its peripheral parts will be described. FIGS. 11(A)–11(C) are illustrations showing a structure example of a sensor plate of the conventional seat weight measuring apparatus. FIG. 11(A) is a plan view of the sensor plate, FIG. 11(B) shows a section taken along a line X–X' of FIG. 11(A), and FIG. 11(C) is a circuit diagram of the sensor. In FIGS. 11(A)–11(C), the sensor plate is marked with a numeral 51.

A sensor 50 comprises a sensor plate (spring member) 51 as a base thereof and an insulating layer (lower insulating layer) 52 formed on the sensor plate 51 for electrical insulation. Selectively formed on the insulating layer 52 is a wiring layer 53. Further selectively formed on the wiring layer 53 is a resistor layer 54 to compose a strain gauge. In addition, an insulating layer (upper insulating layer) 55 is applied over these layers as a protective layer. In this manner, the electrical circuit including resistors is directly laminated on the spring member 51, thereby reducing the working cost and the assembly cost and further improving the heat resistance and the corrosion resistance.

The sensor plate 51 is a rectangular plate having two necks 52c as a whole. The sensor plate 51 is provided with a central hole 51a in the center thereof and bolt holes 51b formed in both end portions thereof. The sensor 50 is formed around the central hole 51a and between the central hole 51a and the bolt holes 51b. V-shaped concaved necks are provided in opposite side edges of regions 51c between the central hole 51a and the bolt holes 51b. These necks ensure positions to be deformed of the sensor plate 51, thereby preventing positional variation of distortion and stabilizing the sensitivity of the sensor 50.

The sensor 50 is substantially symmetrical about the center of the central hole 51a. That is, the sensor 50 is composed of four resistor-type strain gauges of which two 54a, 54b to be applied with tensile distortion are arranged near the bolt holes 51b (near the ends), and the other two 54c, 54d to be applied with compressive distortion are arranged near the central hole 51a (central side). The four resistor-type strain gauges 54a, 54b, 54c, and 54d are connected to each other by wirings 53a, 53b, 53c, and 53d to form a bridge circuit shown in FIG. 11(C). Squares marked with numerals 1, 2, 3, 4 in FIG. 11(C), are terminals.

Arranged between the resistor-type strain gauges 54a, 54c and the resistor-type strain gauges 54b, 54d is a sensitivity control resistor 54e. It should be noted that the load may be obtained by conversion from deflection of the sensor plate 51 detected by electrical capacitance pressure sensors or Hall elements, instead of the detection of distortion of the sensor plate 51 being detected by the resistor-type strain gauges 54a, 54b, 54c, and 54d.

In the load sensor, for example as shown in FIG. 11(A), the load is measured by causing deformation of the sensor plate 51 due to the load, detecting the distortion due to the deformation by the strain gauges 54a, 54b, 54c, and 55d shown in FIG. 11(C), and detecting the output of the bridge circuit composed of these strain gauges as described above.

However, variation in value of resistance of the strain gauge depends on not only the distortion but also the temperature. That is, when the environmental temperature of the seat weight measuring apparatus rapidly changes, the temperature of the sensor base 45 having a relatively large surface area is changed. The change in temperature is transmitted to the sensor plates 37 (51) via the bolts (sensor post) 49. A temperature difference is generated among the strain gauges 54a, 54b, 54c, and 54d on the sensor plate 51. This temperature differences produces a difference in values of resistances. Accordingly, the output of the bridge circuit composed of these strain gauges is outputted, causing error in weight measurement.

SUMMARY OF THE INVENTION

An object of the present invention is to provide a load sensor hardly causing error in weight measurement even when the environmental temperature of the load sensor varies, and a seat weight measuring apparatus using the same.

According to a first exemplary embodiment of the present invention a load sensor comprising a base plate which is deformed when subjected to a load and a plurality of strain gauges which are attached to said base plate to form a bridge circuit is provided. The load sensor measures a load by detecting an electrical signal from the bridge circuit, and is characterized in that said strain gauges forming the bridge circuit are attached to the front and back surfaces of said base plate at substantially the same location to compensate the variation in resistance among the strain gauges generated due to the temperature distribution of said base plate.

According to this embodiment, the strain gauges composing the bridge circuit are attached to the front and back surfaces of the base plate at substantially the same location, thereby compensating the variation in resistance among the strain gauges generated due to the temperature distribution of said base plate. "Attached to the front and back surfaces at substantially the same location" means "attached to such positions of the front and back surfaces as to be superposed on each other as seen in the top view thereof". "Substantially the same location" means that there is some permissibility in the attached positions within such a range that the temperature compensation can be conducted to a desired accuracy.

As for the portions of the front and back surfaces of the base plate at the same location, when one is subjected to tensile force, the other is subjected to the compressive force, and vice versa. However, the variations in resistance due to temperature act equally. By utilizing this feature, the bridge circuit is structured such that the variations in resistance among the strain gauges generated due to the temperature distribution of the base plate can be compensated and the load on the base plate can be detected. In addition, it is possible to compensate the temperature.

According to a second exemplary embodiment of the present invention a load sensor is provided with strain gauges attached to the front and back surfaces of said base plate at substantially the same location are connected to adjacent sides of the bridge circuit.

Since the strain gauges to be attached to the front surface and the back surface of the base plate at substantially the same location are connected to adjacent sides of the bridge circuit, the bridge circuit produces an output relative to variation in resistance between the strain gauges due to load variation, that is, when the resistance of one of a pair of strain gauges increases and the resistance of the other one decreases. On the other hand, the bridge circuit works to cancel variation in resistance due to temperature. Therefore, the bridge circuit is structured such that it can detect the load applied to the base plate and can conduct the temperature compensation.

A third exemplary embodiment of the present invention includes a load sensor formed by adhering a flexible substrate made of an insulating material, on which the strain gauges, electrical components and a circuit pattern as the auxiliaries are previously mounted, to said base plate.

According to this embodiment, the load sensor is formed by previously mounting the strain gauges, electrical components and a circuit pattern as the auxiliaries on the flexible substrate, and adhering the flexible substrate to the base plate to be subjected to load. The mounting work of the strain gauges, and the electrical components and the circuit pattern as the auxiliaries to the flexible substrate is easier than the mounting work of these components to the base plate to be subjected to load. In addition, the manufacturing process for this does not require the burning. Accordingly, this means provides easy manufacturing and achieves the reduction in manufacturing cost.

A fourth exemplary embodiment of the present invention includes a load sensor wherein the flexible substrate is composed of two insulating materials sandwiching a conductive member forming a ground pattern therebetween, and said ground pattern is in communication with a ground line mounted on the front surface of the flexible substrate.

According to this embodiment, a conductive member forming a ground pattern is sandwiched between two insulating materials and is in communication with a ground line mounted on the front surface of the flexible substrate via a through hole formed in one of the insulating materials or the like. Therefore, the ground pattern can be designed to have substantially the same area as the area of the flexible substrate, thereby improving the noise resistant.

A fifth exemplary embodiment of the present invention includes a load sensor wherein the flexible substrate in which a conductive member forming a ground pattern is embedded, and said ground pattern is in communication with a ground line mounted on the front surface of the flexible substrate.

The load sensor includes conductive material formed into a ground pattern that is completely enclosed by the flexible substrate made of an insulating material, thereby preventing the oxidization of the ground pattern and improving the durability.

A sixth exemplary embodiment of the present invention includes a load sensor wherein a ground pattern is provided via an insulating member on at least one of the upper side and the lower side of the strain gauges, the electrical components and/or the circuit pattern, and said ground pattern is in communication with a ground line mounted on the front surface of the flexible substrate.

According to this embodiment, a ground pattern is provided via an insulating member on at least one of the upper side and the lower side of the strain gauges, the electrical components and/or the circuit pattern, and said ground pattern is in communication with a ground line mounted on the front surface of the flexible substrate, thereby improving the noise resistance of the load measuring circuit.

A seventh exemplary embodiment of the present invention includes a load sensor wherein the ground pattern is in communication with the ground line which is mounted on the front surface of the flexible substrate via an RC parallel circuit.

According to this embodiment, since the ground pattern is in communication with the ground line mounted on the front surface of the flexible substrate via the RC parallel circuit, surge can be effectively absorbed by adjusting values of resistance R and capacitance C.

An eighth exemplary embodiment of the present invention includes a load sensor comprising a backing plate which is provided at a portion of said flexible substrate on which the electrical components are mounted.

According to this embodiment, a backing plate is provided at a portion of the flexible substrate on which the electrical components are mounted, thereby facilitating the mounting of the electrical components. It should be understood that the surface on which the backing plate is provided is opposite to the surface adhered to the base plate and the electrical components are mounted on the backing plate.

A ninth exemplary embodiment of the present invention includes a load sensor wherein the strain gauges to be attached to the front and back surfaces of said base plate are mounted on a single flexible substrate and are attached to the front and back surfaces of said base plate by folding said flexible substrate and applying said flexible substrate to the front and back surfaces of said base plate.

In this embodiment, since the strain gauges to be attached to the front and back surfaces of the base plate are mounted on a single flexible substrate and are attached to the front and back surfaces of said base plate by folding the flexible substrate and applying the flexible substrate to the front and back surfaces of the base plate, the strain gauges to be attached to the front and back surfaces of the base plate can be attached to the base plate at once and the positions of the strain gauges on the front and back surfaces can be easily adjusted.

A tenth exemplary embodiment of the present invention includes a seat weight measuring apparatus for measuring the weight of a vehicle seat including the weight of an occupant sitting thereon, comprising: a load sensor which is disposed inside a seat or between the seat and a vehicle body and which receives at least a part of the weight of the vehicle seat and converts the received weight into an electrical signal, and wherein the load sensor is a load sensor described above in the exemplary embodiments.

According to this embodiment, since any of the load sensors described above is employed as the load sensor, works and effect as described in the above corresponding to the respective sensors can be obtained, respectively.

It is to be understood that both the foregoing general description and the following detailed description are exemplary and exemplary only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIGS. 11(A)–11(C) are illustrations showing a sensor plate of the conventional seat weight measuring apparatus.

DETAILED DESCRIPTION OF THE PREFERRED EMBODIMENTS

Figure 9:
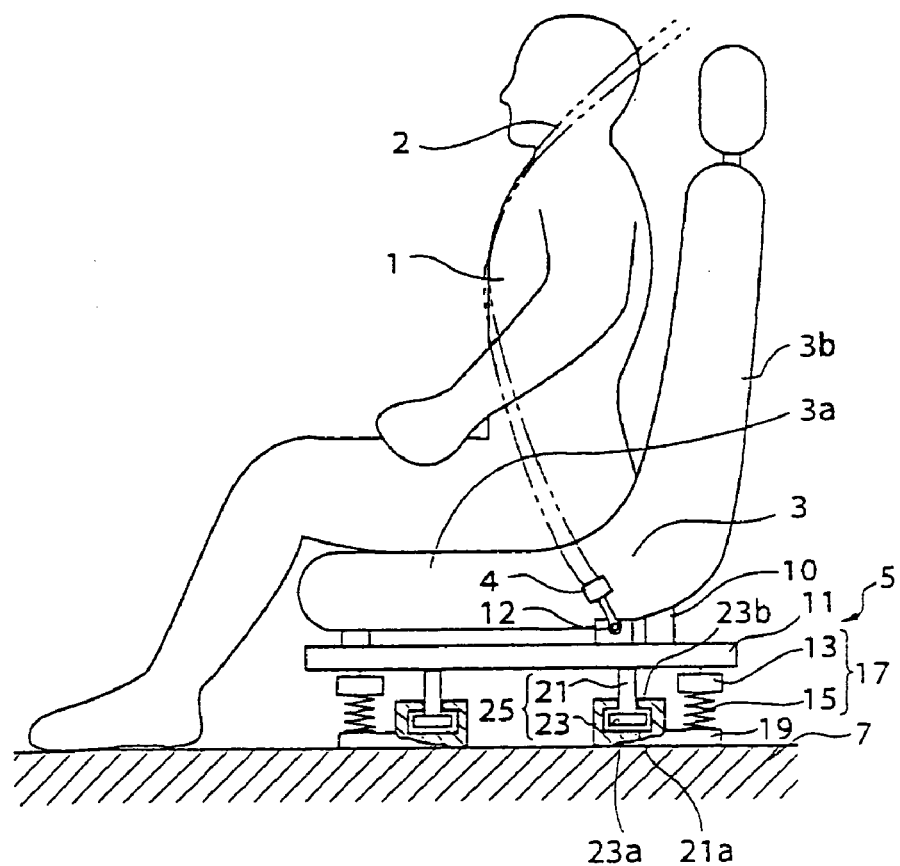
FIG. 9 is a side view schematically showing the entire structure of a conventional seat weight measuring apparatus.
Figure 10A:
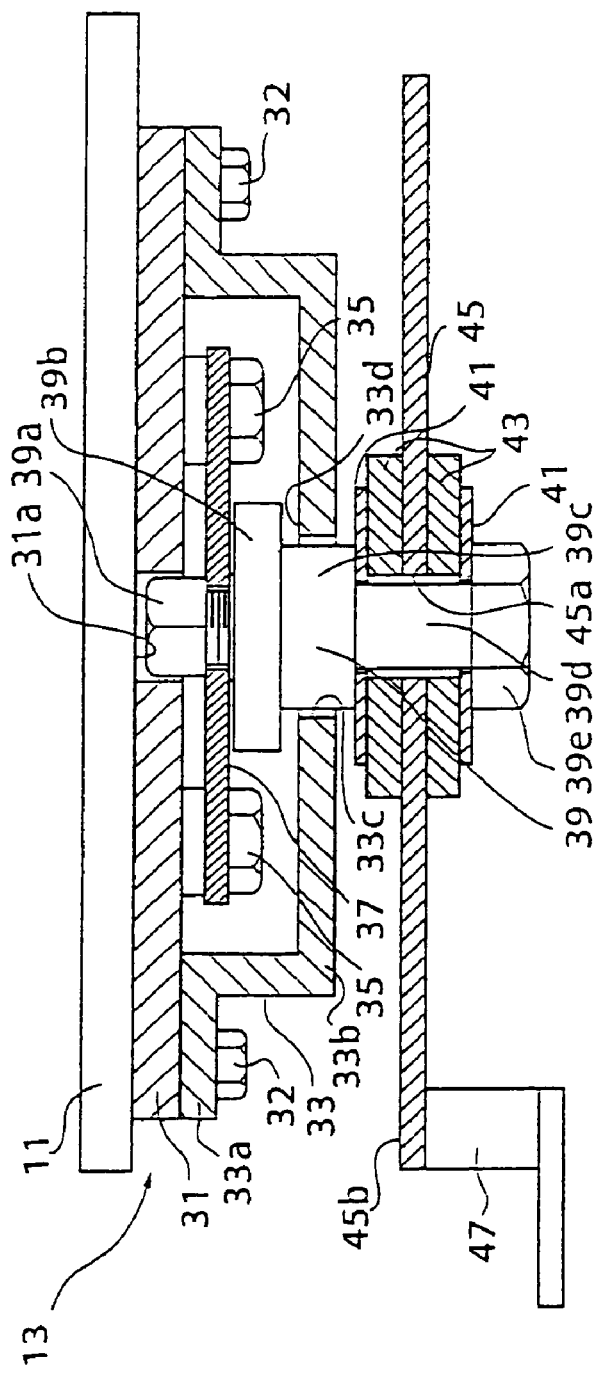
FIGS. 10(A), 10(B) are illustrations of the structure of the conventional seat weight measuring apparatus.
Figure 10B:
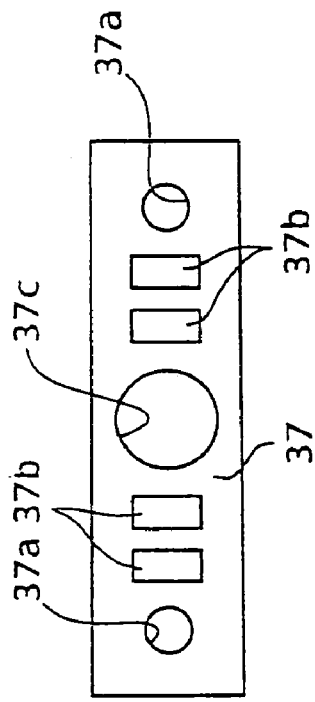

Hereinafter, embodiments of the present invention will be described in detail with reference to the drawings. Since the basic structure of the load sensor is identical to that shown in FIGS. 10(A) through 11(C), the detail description of the function will be omitted in the following description of the embodiments. Since the seat load measuring apparatus of the embodiment is identical to that shown in FIG. 9 except the structure of the load sensor, the description of the seat load measuring apparatus will be omitted.

Figure 1:
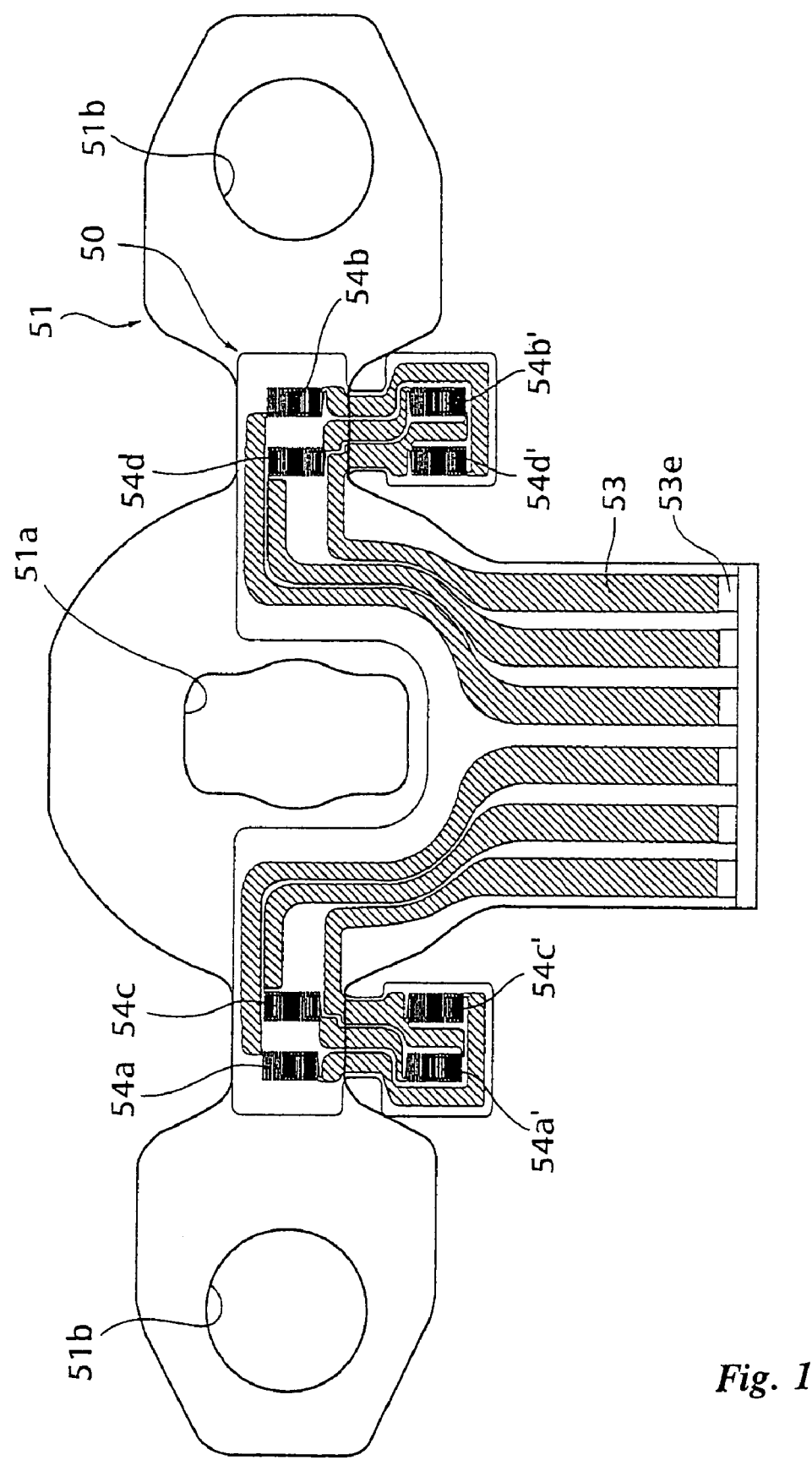
FIG. 1 is an illustration schematically showing a load sensor of an embodiment of the present invention.

FIG. 1 is an illustration showing a load sensor of the embodiment of the present invention. In FIG. 1, a numeral 51 designates a sensor plate, which is the same as the sensor plate 37 in FIGS. 10(A), 10(B) and the sensor plate 51 in FIGS. 11(A)–11(C). The holes formed in the sensor plate 51 are marked with the same numerals as used in FIG. 11(A). The description of the holes will be omitted.

The sensor plate or load sensor 51 includes a sensor 50. The sensor 50 is arranged on the sensor plate 51. Employed as the sensor 50 in the embodiment is a sensor comprising a flexible substrate, and strain gauges and print wirings which are arranged on the flexible substrate. That is, the sensor 50 is composed of a single flexible substrate.

That is, in the sensor 50, strain gauges and print wirings are formed on a thin film of polyimide. Another thin film of polyimide is further formed on them so that the strain gauges and the print wirings are sandwiched by the polyimide thin films, thereby forming the flexible substrate.

The sensor 50 includes strain gauges 54a' through 54d' in addition to the strain gauges 54a through 54d. These strain gauges are connected to each other via the print wirings 53 shown with hatching. Each print wiring 53 has a terminal 53e through which the communication to and from the outside is established.

One difference of this embodiment from the conventional one shown in FIGS. 11(A)–11(C) is that the strain gauges 54a' through 54d' are provided. In the actual load sensor, portions of the flexible substrate on which the strain gauges 54a' through 54d' are formed (portions projecting from the sensor plate 51 in FIG. 1) are folded and adhered to the back of the sensor plate. Therefore, the strain gauges 54a' through 54d' are formed on the backs of the portions of the sensor plate 51 where the strain gauges 54a through 54d are arranged, respectively.

Figure 2:
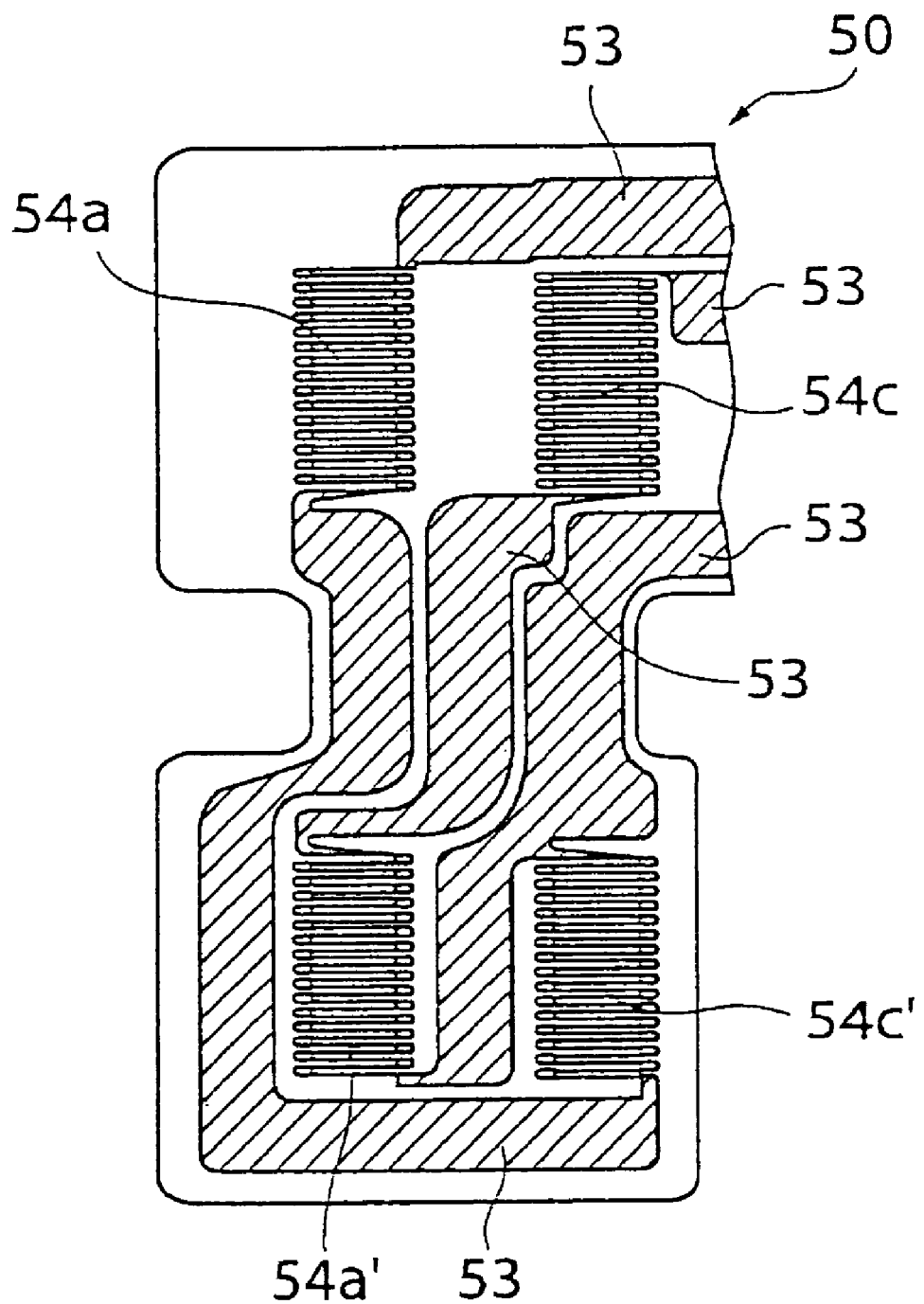
FIG. 2 is an enlarged view of a sensor portion of the load sensor in FIG. 1.

FIG. 2 is an enlarged view of a left side portion of the sensor 50 in FIG. 1. The strain gauges 54a, 54c, 54a' 54c' are connected each other by the print wiring 53 as shown in FIG. 2.

Figure 3:
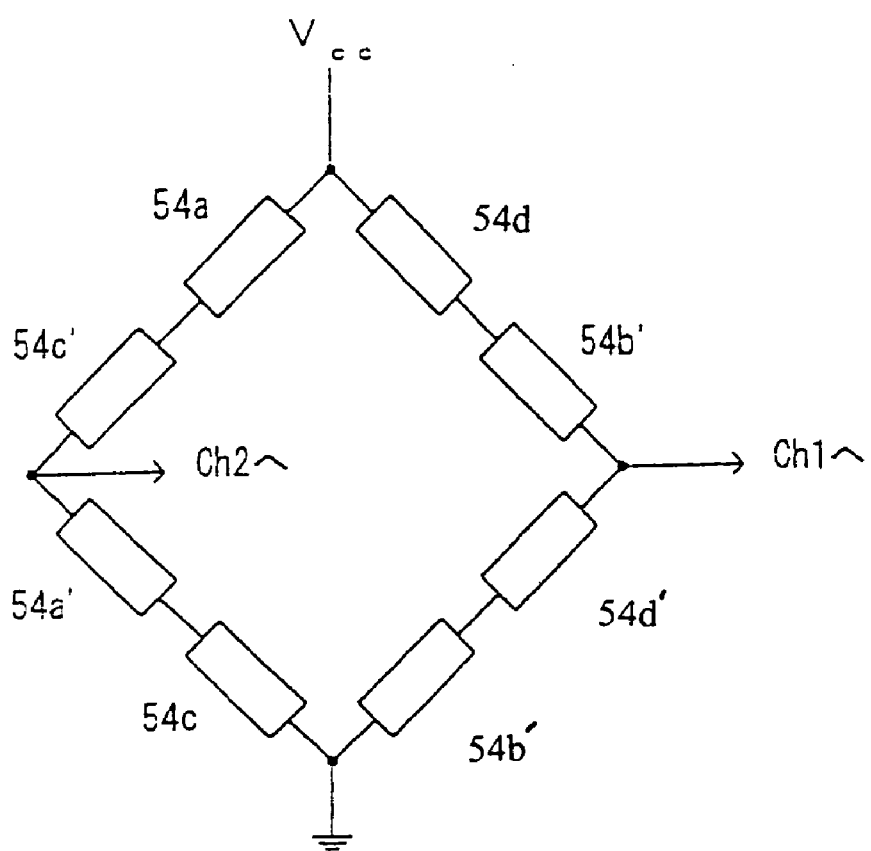
FIG. 3 is a diagram showing a bridge circuit composed of strain gauges.

FIG. 3 shows a bridge circuit composed of the strain gauges. The basic structure of the circuit is identical to that shown in FIG. 11(C), except that the new strain gauges 54a' through 54d' are added as shown in FIG. 3.

As the sensor plate 51 is subjected to a bending load corresponding to variation in load, tensile force and compressive force are applied to the sensor plate 51 such that when the front surface of the sensor plate 51 is subjected to the tensile force, the back surface of the sensor plate 51 is subjected to the compressive force, and vice versa. Therefore, the variation in distortion generated between the strain gauge 54a' and the strain gauge 54c' has an amount substantially equal to, but having an opposite sign, that of distortion between the strain gauge 54a and the strain gauge 54c. Similarly, the variation in distortion generated between the strain gauge 54b' and the strain gauge 54d' has an amount substantially equal to, but having an opposite sign, that of distortion between the strain gauge 54b and the strain gauge 54d. According to the electric connection as shown in FIG. 3, the output obtained by the bridge circuit shown in FIG. 3 is substantially twice of the output obtained by the bridge circuit shown in FIG. 11(C).

When the temperatures of the sensor plate vary, the variation in temperature between the strain gauges 54a and 54a', the variation in temperature between strain gauges 54b and 54b', the variation in temperature between the strain gauges 54c and 54c', and the variation in temperature between the strain gauges 54d and 54d' substantially equal, respectively. Since each pair of the strain gauges are disposed on adjacent sides of the bridge circuit shown in FIG. 3, the variation in resistance due to the variation in temperature can be canceled by the bridge circuit, resulting in no or little variation in output. Therefore, the load sensor of this embodiment can measure the variation in load, with no or little influence due to variation in temperature.

Temperature compensation is achieved by providing additional strain gauges (corresponding to the strain gauges 54a'–54d' in this embodiment) on the back of the substrate on which conventional strain gauges (corresponding to the strain gauges 54a–54d in this embodiment) are arranged. Though the strain gauges and the wirings are formed on the flexible substrate by printing or the like in this embodiment, commercially available strain gauges may be attached to the substrate as the strain gauges and, and normal wirings may be used as the wirings and may be connected by wire bonding or soldering.

Though all of the strain gauges are formed on the single flexible substrate and the strain gauges on the back side are adhered to the back by folding the flexible substrate in this embodiment, the strain gauges and wirings on the front side and the strain gauges and wirings on the back side may be formed on separate flexible substrates, respectively and the flexible substrates may be applied to the front and the back of the sensor plate, respectively. Further, only wirings are formed on a flexible substrate by printing or the like and strain gauges may be attached to the flexible substrate by wire bonding or soldering. Furthermore, a bridge circuit as shown in FIG. 3 may be formed on the flexible substrate. In addition to this, a circuit such as an amplification circuit, particularly a circuit composed of a custom IC, may be attached to the flexible substrate.

In either case, the strain gauges, the wirings, and the circuit are preferably sandwiched between flexible insulating members made of polyimide, thereby exhibiting the insulating effect and water-proof effect.

Hereinafter, description will be made as regard to an example of adhering the flexible substrate, made of an insulating material on which the strain gauges, the electrical components, and the circuit pattern are previously mounted, to a base plate which is deformed when subjected to a load.

Figure 4:
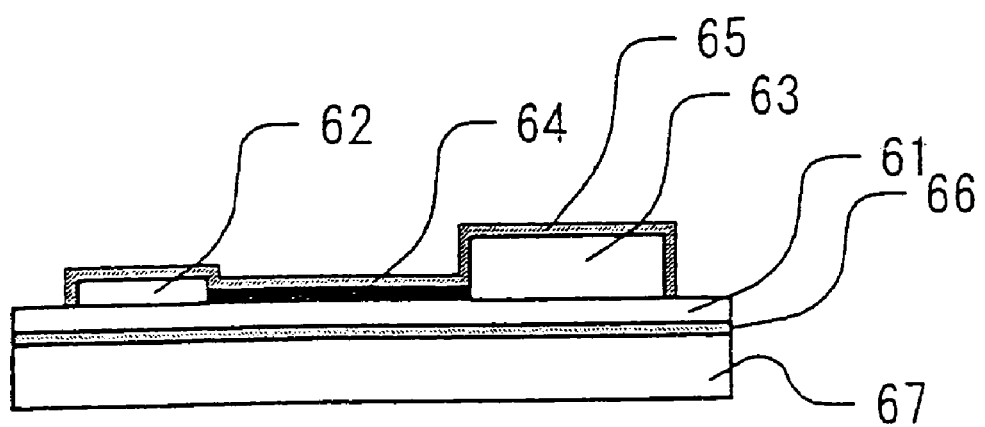
FIG. 4 is a schematic illustration showing a structure example of a load sensor circuit formed on a flexible substrate.

FIG. 4 is a schematic illustration showing a structure example of a load sensor circuit formed on a flexible substrate. Mounted on a flexible substrate 61 made of an insulating material are a strain gauge 62 and an electrical component 63 such as an amplifier for processing the signal from the strain gauge 62, which are connected to each other by a print wiring 64. To isolate and protect the mounted objects from the outside, a protective film 65 made of an insulating material is formed to wrap around the mounted objects.

In this manner, the flexible substrate 61 on which necessary electrical circuit components are mounted is adhered to a base plate 67 with adhesive 66, thereby completing a load sensor. The base plate 67 is generally made of a metallic body and has a deformable portion at least right under the strain gauge 62 where can be deformed when subjected to a load. As an example, the base plate 67 may be formed to have a thinner portion to form the deformable portion.

As the base plate 67 is deformed at the deformable portion when subjected to a load, the deformation is transmitted to the strain gauge 62 on the flexible substrate 61 adhered to the base plate 67 by the adhesive 66 and is converted into an electrical signal. The electrical signal is processed by the electrical component 63 such as an amplifier and then is transmitted to a control device such as a CPU via a wiring which is not shown.

Figure 5:
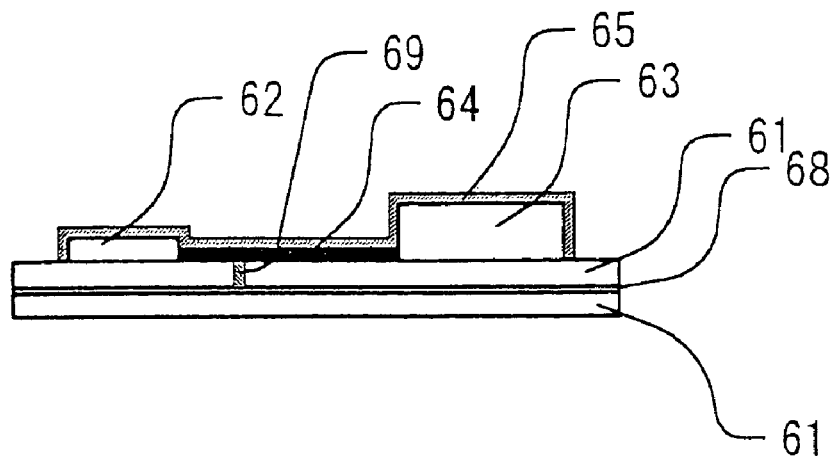
FIG. 5 is an illustration showing another example in which electrical circuit components are mounted on a flexible substrate before adhered to the base plate.
Figure 6:
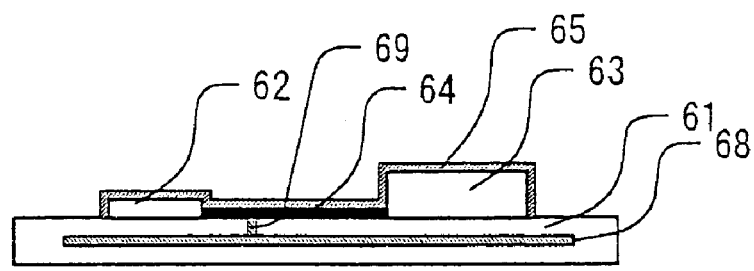
FIG. 6 is an illustration showing another example in which electrical circuit components are mounted on a flexible substrate before adhered to the base plate.
Figure 7:
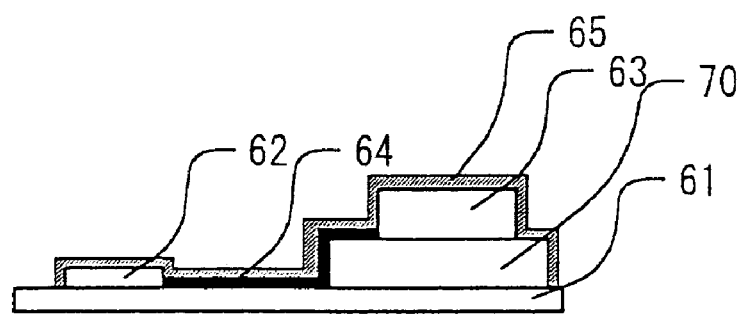
FIG. 7 is an illustration showing another example in which electrical circuit components are mounted on a flexible substrate before adhered to the base plate.

FIG. 5 shows another example of a structure comprising a flexible substrate and electrical circuit components which are mounted on the flexible substrate before adhered to the base plate 67. In FIGS. 5–7, the same components as the components shown in the previously described drawings are marked with the same numerals. In this example, a conductive material 68 is sandwiched between two flexible substrates 61, thereby forming a ground pattern. Generally, the area of the ground pattern is made as larger as possible. The ground pattern is connected to a ground line composed of a print wiring 64 through a through hole 69. When the member having the aforementioned structure is adhered to the base plate 67, the ground pattern functions as an electromagnetic insulating member, thus preventing the ingression of noise into the electronic circuit.

FIG. 6 shows still another example of a structure comprising a flexible substrate and electrical circuit components which are mounted on the flexible substrate before adhered to the base plate 67. This structure is substantially the same as that shown in FIG. 5. A different point from that shown in FIG. 5 is that the conductive material is completely enclosed by the flexible substrate 61. This structure can prevent the oxidization of the conductive material 68 (ground pattern).

FIG. 7 shows yet another example of a structure comprising a flexible substrate and electrical circuit components which are mounted on the flexible substrate before adhered to the base plate 67. In this example, a backing plate 70 is provided at a portion on which the electrical component 63 such as an amplifier is mounted. The electrical component 63 is mounted on the backing plate 70. Since an electrical component such as an IC generally has connector pins, it may be difficult to mount the electrical component directly on the flexible substrate 61. However, the presence of the backing plate 70 can facilitate the mounting. Unlike the portion where the strain gauge 62 is attached, the portion where the backing plate 70 is mounted is not required to be deformed, preferably never deformed, no disadvantage is generated by the presence of the backing plate 70.

Figure 8:
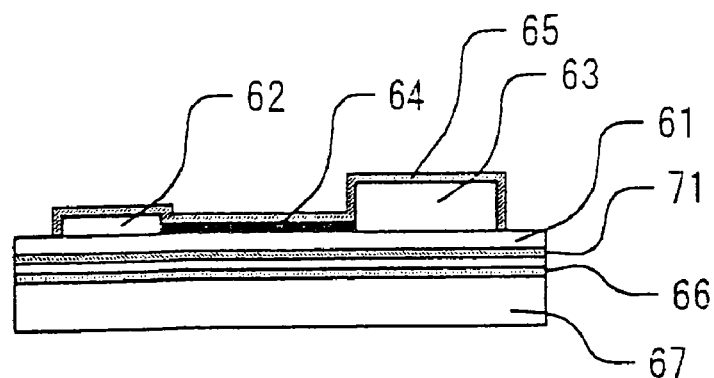
FIG. 8 is a schematic illustration showing another structure example of a load sensor circuit formed on a flexible substrate.

FIG. 8 shows a structure in which a ground pattern 71 is arranged inside the flexible substrate 61 so as to shield the strain gauge 62, the print wiring 64, and the electrical components 63. The ground pattern 71 may be connected to a ground line composed of the print wiring 64 by a through hole. In addition, a ground pattern may be arranged inside a protective layer 65.

As can be seen from the foregoing description, the present invention can provide a load sensor that reduces the error in weight measurement even when the environmental temperature of the load sensor varies, and a seat weight measuring apparatus using the same.

The priority application, Japanese Patent Application No. 2002-376643, filed on Dec. 26, 2002, is hereby incorporated by reference herein in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A load sensor comprising a base plate which is deformed when subjected to a load and a plurality of strain gauges which are attached to said base plate to form a bridge circuit, wherein the bridge circuit is configured to include a pair of strain gauges on each side of the bridge circuit, and
    wherein said load sensor measures a load by detecting an electrical signal from the bridge circuit, wherein said strain gauges forming the bridge circuit are attached to the front and back surfaces of said base plate at substantially the same location to compensate the variation in resistance among the strain gauges generated due to the temperature distribution of said base plate.

2. A load sensor according to claim 1, wherein said load sensor includes a flexible substrate on which the strain gauges, electrical components and a circuit pattern as the auxiliaries are mounted wherein the substrate is made of an insulating material and is adhered to said base plate.

3. A load sensor according to claim 2, wherein said flexible substrate is composed of two insulating materials sandwiching a conductive member forming a ground pattern therebetween, and said ground pattern is in communication with a ground line mounted on the front surface of the flexible substrate.

4. A load sensor according to claim 2, wherein said flexible substrate in which a conductive member forming a ground pattern is embedded, and said ground pattern is in communication with a ground line mounted on the front surface of the flexible substrate.

5. A load sensor according to claim 2, wherein a ground pattern is provided via an insulating member on at least one of the upper side and the lower side of the strain gauges, the electrical components, the circuit pattern, and said ground pattern is in communication with a ground line mounted on the front surface of the flexible substrate.

6. A load sensor according to claim 2, further comprising a backing plate which is provided at a portion of said flexible substrate on which the electrical components are mounted.

7. A load sensor according to claim 2, wherein said strain gauges are mounted on a single flexible substrate and are attached to the front and back surfaces of said base plate by folding said flexible substrate and applying said flexible substrate to the front and back surfaces of said base plate.

8. A load sensor wherein strain gauges forming a bridge circuit are attached to front and back surfaces of a base plate at substantially the same location to compensate the variation in resistance among the strain gauges generated due to the temperature distribution of said base plate, and wherein the bridge circuit is configured to include a pair of strain gauges on each side of the bridge circuit.

9. A seat weight measuring apparatus for measuring the weight of a vehicle seat including the weight of an occupant sitting thereon, comprising:
   a load sensor which is disposed inside a seat or between the seat and a vehicle body and which receives at least a part of the weight of the vehicle seat and converts the received weight into an electrical signal,
   wherein said load sensor measures the received weight by detecting an electrical signal from a bridge circuit, wherein the bridge circuit is configured to include a pair of strain gauges on each side of the bridge circuit, and
   wherein said strain gauges forming the bridge circuit are attached to the front and back surfaces of said base plate at substantially the same location to compensate the variation in resistance among the strain gauges generated due to the temperature distribution of said base plate.

10. A load sensor according to claim 1, wherein said load sensor includes a flexible, insulating substrate and a conductive material, the conductive material being surrounded by the flexible substrate.

11. A load sensor comprising a base plate which is deformed when subjected to a load and a plurality of strain gauges which are attached to said base plate to form a bridge circuit, wherein:
   said load sensor measures a load by detecting an electrical signal from the bridge circuit, wherein said strain gauges forming the bridge circuit are attached to the front and back surfaces of said base plate at substantially the same location to compensate the variation in resistance among the strain gauges generated due to the temperature distribution of said base plate,
   wherein said load sensor includes first and second flexible, insulating substrate layers and a conductive material, the conductive material being positioned between the first and second flexible, insulating substrate layers such that the first and second flexible, insulating substrate layers extend for the entire length of the conductive material.

* * * * *